United States Patent [19]

Yasuba et al.

[11] 4,296,657
[45] Oct. 27, 1981

[54] METHOD AND APPARATUS FOR POSITIONING WORK ON A NUMERICALLY CONTROLLED LATHE

[75] Inventors: Shoichi Yasuba, Seto; Takaharu Ito, Kasugai, both of Japan

[73] Assignee: Okuma Machinery Works, Ltd., Nagoya, Japan

[21] Appl. No.: 131,540

[22] Filed: Mar. 18, 1980

[30] Foreign Application Priority Data

Mar. 23, 1979 [JP] Japan .................................. 54/34840

[51] Int. Cl.³ ........................ B23B 3/00; B23B 13/00; B23B 3/16
[52] U.S. Cl. ...................................... 82/1 C; 82/2.5; 29/36
[58] Field of Search .................... 82/2 B, 2.5, 2.7, 1 C; 29/36

[56] References Cited

U.S. PATENT DOCUMENTS

| | | | |
|---|---|---|---|
| 3,680,413 | 8/1972 | Hiney | 82/2.5 |
| 3,765,278 | 10/1973 | Fisher et al. | 82/2.5 |
| 3,821,835 | 7/1974 | St. Andre et al. | 29/36 |
| 3,895,424 | 7/1975 | Hautau | 82/2.5 |
| 4,061,062 | 12/1977 | Peltier | 82/1 C |
| 4,064,774 | 12/1977 | Maddock | 82/2.5 |

*Primary Examiner*—Harrison L. Hinson
*Attorney, Agent, or Firm*—Oblon, Fisher, Spivak, McClelland & Maier

[57] ABSTRACT

A numerically controlled, dual-turret lathe includes a pair of indexing turrets mounted on respective cross slides which in turn are slidably mounted on respective saddles for movement in the transverse direction of the lathe, the saddles themselves being mounted on a lathe bed for sliding movement in the longitudinal direction of the lathe. The turrets have mounted thereon a cooperative pair of gripper pawls capable of releasably holding work therebetween. As dictated by a prescribed program a numerical control system controls the movements of the cross slides and the saddles so as to cause the gripper pawls to carry the work from a preassigned standby position on the lathe bed into the chuck on the work spindle of the lathe, preparatory to the machining of the work by tools carried by the turrets.

10 Claims, 5 Drawing Figures

METHOD AND APPARATUS FOR POSITIONING WORK ON A NUMERICALLY CONTROLLED LATHE

BACKGROUND OF THE INVENTION

1. Field of the Invention

Our invention pertains to the automatic positioning of work on machine tools. The invention is directed more specifically to a method of, and means for, automatically carrying or feeding work from a prescribed standby position to a machining position on a lathe of the type having a numerical control (N/C) system, sometimes called a "director" by the specialists, for automating its operation.

2. Description of the Prior Art

A variety of N/C machine tools which are equipped to automatically feed work to a machining position have been suggested and used. U.S. Pat. No. 3,691,879 issued to Blake on Aug. 19, 1972, for example, proposes a saddle-type turret lathe which features a gripper carried by a saddle-mounted turret for pulling a desired length of bar stock out of a chuck to a work station. An objection to this known work feed mechanism is its limited utility only in conjunction with continuous bar stock, not with discrete workpieces. Moreover, since the gripper is of the collet chuck type, with several resilient "fingers", it does not lend itself for use with bar stock of other than a preselected diameter.

Japanese Utility Model Laid Open Publication No. 33880/1975 and Japanese Patent Laid Open Publication No. 36683/1976 both teach the mounting of a work-gripping chuck, with movable jaws, on a turret for transporting and positioning cylindrical work on the chuck on the end of the work spindle. Such devices are objectionable in view of the inevitable limitations on the size of the work that can be held by the single work-gripping chuck on the turret. Further, the opening and closing of the chuck jaws requires complex control and actuating mechanisms.

Japanese Patent Publication No. 25992/1977 suggests a lathe in which a work gripper, also with movable jaws or fingers, is mounted in an indexing tailstock for pulling bar stock out of a hollow work spindle. The movable gripper jaws in the indexing tailstock are capable of handling not only continuous bar stock within the hollow work spindle but also other discrete, cylindrical workpieces. The sizes of the work that can be handled are also limited, however. Additional drawbacks are that the indexing tailstock with the built-in gripping means is extremely complex in construction and difficult to control, and that this concept does not apply, of course, to lathes having no tailstock.

SUMMARY OF THE INVENTION

A general object of our invention is the provision of a method of, and means for, automatically carrying work of varying sizes from a preassigned standby position to a machining position on a numerically controlled lathe, in a manner well calculated to overcome the listed problems of the prior art.

Our invention will be better understood by first summarizing the construction of the lathe incorporating the inventive concept. The lathe comprises a pair of saddles or carriages mounted on a lathe bed for movement in a first direction, a pair of cross slides mounted on the respective saddles for movement in a second direction at right angles to the first direction, and a cooperative pair of gripper assemblies carried by the respective cross slides for releasably engaging and holding work therebetween upon movement of the cross slides toward each other. Also included is an N/C system for individually controlling the movements of the pair of saddles and the pair of cross slides in accordance with a prescribed program.

In a preferred embodiment of this invention, the pair of gripper assemblies are conveniently carried, along with desired lathe tools, by respective indexing turrets or toolholders mounted on the cross slides. The gripper assemblies include V-shaped gripper pawls, one of which has its opposite ends bifurcated for receiving the opposite ends of the other gripper pawl when the workpiece held therebetween is of small diameter. The two gripper pawls are spring biased toward each other, when the gripper assemblies are in their opposed working positions on the turrets, for securely holding the work under equal but opposite pressures.

According to the inventive method of transporting or feeding work from a preassigned standby position to a machining position on the lathe of the above outlined configuration, the pair of saddles are first moved to such positions on the lathe bed that the pair of gripper assemblies are disposed on the opposite sides of the work lying in the standby position. Then the pair of cross slides are jointly moved toward each other on the respective saddles until the work is caught between the gripper assemblies (i.e., between their V-shaped gripper pawls). Then at least the pair of saddles are jointly moved on the lathe bed for carrying the gripped work to the machining position.

Again in the preferred embodiment, our invention is disclosed as adapted for carrying successive workpieces of cylindrical shape from the standby position on the lathe bed into the chuck on the work spindle of the lathe. We understood, however, that our invention is also adaptable for pulling each predetermined length of bar stock, extending through a hollow work spindle, out of a chuck mounted on its end.

One of the advantages of our invention resides in the capability of the apparatus to handle workpieces of widely varying diameters without modification of the existing parts. This is because the cooperative pair of gripper assemblies are carried by the respective cross slides movable toward and away from each other. As an additional advantage, the standby position of the workpieces can be anywhere on the lathe bed within the reach of the gripper assemblies.

It is also an advantage of our invention that the gripper assemblies can be easily modified, as in another embodiment disclosed herein, to include means for permitting reversal, or turning through an angle of 180 degrees, of the workpiece being held thereby, in order to enable automatic, consecutive machining of its opposite end portions. Such 180-degree workpiece reversal can be accomplished simply as the pair of saddles are jointly moved, together with the workpiece caught by the gripper assemblies, in a direction away from the machining position, without the need for the provision of any particular drive.

The above and other objects, features and advantages of our invention and the manner of attaining them will become more readily apparent, and the invention itself will best be understood, as the description proceeds, with reference had to the accompanying drawings.

DETAILED DESCRIPTION OF THE INVENTION

Figure 1:
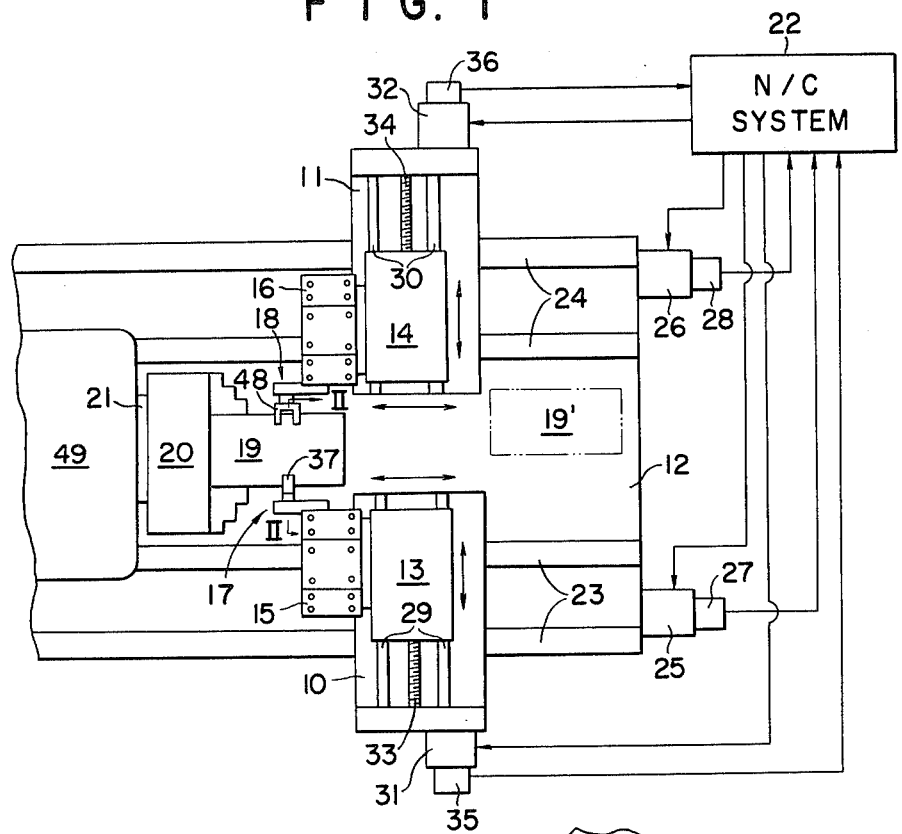
FIG. 1 is a fragmentary, top plan view of a horizontal, dual-turret lathe incorporating the novel concepts of our invention, the lathe being shown together with an N/C system in block form for controlling the movements of its pertinent parts.

Our invention will now be described in detail as applied to the numerically controlled, horizontal, dual-turret lathe shown in FIG. 1. The illustrated lathe broadly comprises:

(1) First and second saddles or carriages 10 and 11 mounted on a lathe bed 12 for movement in a first direction extending longitudinally of the lathe;

(2) First and second cross slides 13 and 14 mounted on the respective saddles 10 and 11 for movement in a second direction extending transversely of the lathe;

(3) First and second indexing turrets or tool-holders 15 and 16 carried by the respective cross slides 13 and 14;

(4) First and second gripper assemblies 17 and 18 attached to the respective turrets 15 and 16 for releasably engaging and holding a cylindrical workpiece 19 therebetween and for carrying the same from a phantomline standby position, designated 19', on the lathe bed 12 to the solid-line machining position;

(5) A chuck 20 mounted on a work spindle 21 for holding the workpiece 19 in the machining position; and (6) An N/C system 22 for controlling the operations of the various moving parts of the lathe including the saddles 10 and 11 and the cross slides 13 and 14.

Spaced from each other in the transverse direction of the lathe, the first and second saddles 10 and 11 travel along respective guideways 23 and 24 formed longitudinally on the lathe bed 12. For controlled movements of these saddles 10 and 11, first and second servomotors 25 and 26 are mounted on the right end, as seen in FIG. 1, of the lathe bed 12. The servomotors 25 and 26 are connected in driving relationship to feed screws (not shown) extending longitudinally of the lathe and engaged with internally threaded members (not shown) mounted on the undersides of the saddles 10 and 11, respectively.

Under the control of the N/C system 22, the first and second servomotors 25 and 26 rotate bidirectionally to cause back-and-forth travel of the first and second saddles 10 and 11 along the guideways 23 and 24, respectively. Operatively coupled to the respective servomotors 25 and 26 are first and second position sensors 27 and 28 which feed back to the N/C system 22 digital signals representative of the positions of the saddles 10 and 11 in the longitudinal direction of the lathe.

The first and second cross slides 13 and 14 travel along respective transverse guideways 29 and 30 on the saddles 10 and 11. Third and fourth servomotors 31 and 32 are mounted on the outer ends of the saddles 10 and 11 and coupled in driving relationship to transverse feed screws 33 and 34 rotatably mounted on the saddles, respectively. The transverse feed screws 33 ad 34 extend through internally threaded members (not shown) mounted on the undersides of the cross slides 13 and 14, respectively.

Under the control of the N/C system 22, the servomotors 31 and 32 also rotate bidirectionally to cause back-and-forth travel of the cross slides 13 and 14 along the transverse guideways 29 and 30. Third and fourth position sensors 35 and 36 are operatively coupled to the respective servomotors 31 and 32 for feeding back to the N/C system 22 digital signals representative of the positions of the cross slides 13 and 14 in the transverse direction of the lathe.

The first and second indexing turrets 15 and 16 are mounted on those sides of the cross slides 13 and 14 which are oriented toward the work spindle 21, for rotation about parallel, horizontal axes extending longitudinally of the lathe. As is well known, each turret has several tool-mounting surfaces. The first gripper assembly 17 is attached to one of these tool-mounting surfaces of the first indexing turret 15, and the second gripper assembly 18 is likewise attached to one of the tool-mounting surfaces of the second indexing turret 16.

Figure 2:
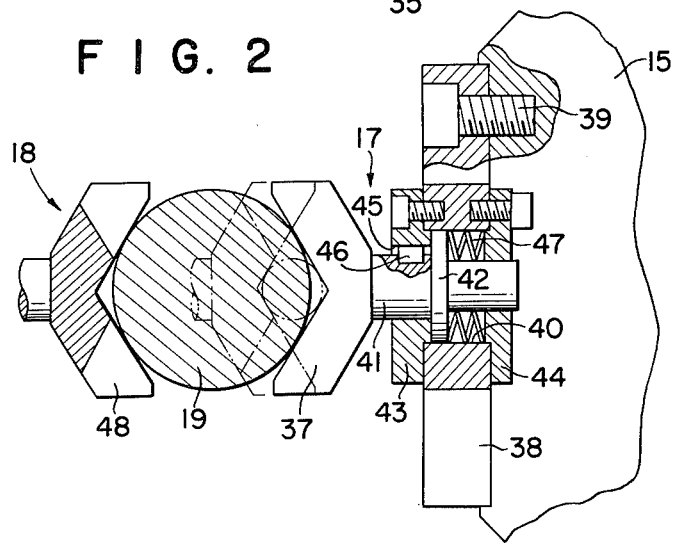
FIG. 2 is a relatively enlarged, vertical sectional view taken along the line II—II of FIG. 1 and showing in particular the cooperative pair of gripper assemblies.

FIG. 2 shows the first gripper assembly 17 in detail. Essentially the gripper assembly 17 comprises a gripper pawl 37 in the shape of a recumbent V, and means for mounting the gripper pawl on the turret 15 so as to permit spring-biasing of the gripper pawl in a direction radially outwardly of the turret. The mounting means include a mounting base 38 fastened to the turret 15 by several countersunk screws 39 (one shown). The mounting base 38 has formed therein a bore 40 extending radially of the turret 15 for receiving a gripper pawl spindle 41 which is rigidly coupled endwise to the gripper pawl 37. The gripper pawl spindle 41 has a flange 42 formed intermediate between its ends, which flange is disposed in sliding fit in the bore 40.

Closing the opposite ends of the bore 40 are end plates 43 and 44 which are screwed or otherwise fastened to the mounting base 38. These end plates are both axially bored to permit the gripper pawl spindle 41 to pass slidably therethrough. The front end plate 43 has formed therein a keyway 45 slidably receiving a feather key 46 anchored to the gripper pawl spindle 41, thereby preventing the rotation of the gripper pawl spindle while permitting its axial motion.

A disc spring assembly 47 is interposed between the gripper pawl spindle flange 42 and the rear end plate 44 to resist a force tending to compress the same. This spring assembly serves to urge the gripper pawl 37 toward the second gripper assembly 18 when the indexing turret 15 is in the illustrated angular position. Normally the gripper pawl spindle flange 42 is spring biased into abutment against the front end plate 43. The geometrical center of the gripper pawl 37, or the axis of the gripper pawl spindle 41, lies in a horizontal plane containing the axis of the chuck 20 on the work spindle 21 when the turret 15 is indexed to the illustrated angular position.

The second gripper assembly 18 is identical in construction with the first gripper assembly 17 except for the shape of its gripper pawl 48 coacting with the first gripper pawl 37 to hold the workpiece 19 therebetween. Although also generally in the shape of a recumbent V, the second gripper pawl 48 has its opposite ends bifurcated for loosely receiving the opposite ends of the first gripper pawl 37. This interdigitating feature permits the pair of gripper pawls 37 and 48 to grip extremely small diameter workpieces such as the phantom workpiece shown in FIG. 2. The force of the spring assembly (not shown) biasing the second gripper pawl 48 radially outwardly of the second turret 16 is equal to the force of the spring assembly 47.

With reference back to FIG. 1, the chuck 20 is mounted on the end of the work spindle 21 projecting from a headstock 49. The gripping jaws of the chuck 20 are assumed to be operated under the control of the N/C system 22 for automatically engaging and disengaging the workpiece 19. The headstock 49 houses the usual transmission mechanism (not shown) which operates the work spindle 21 at any selected speed.

Figure 3:
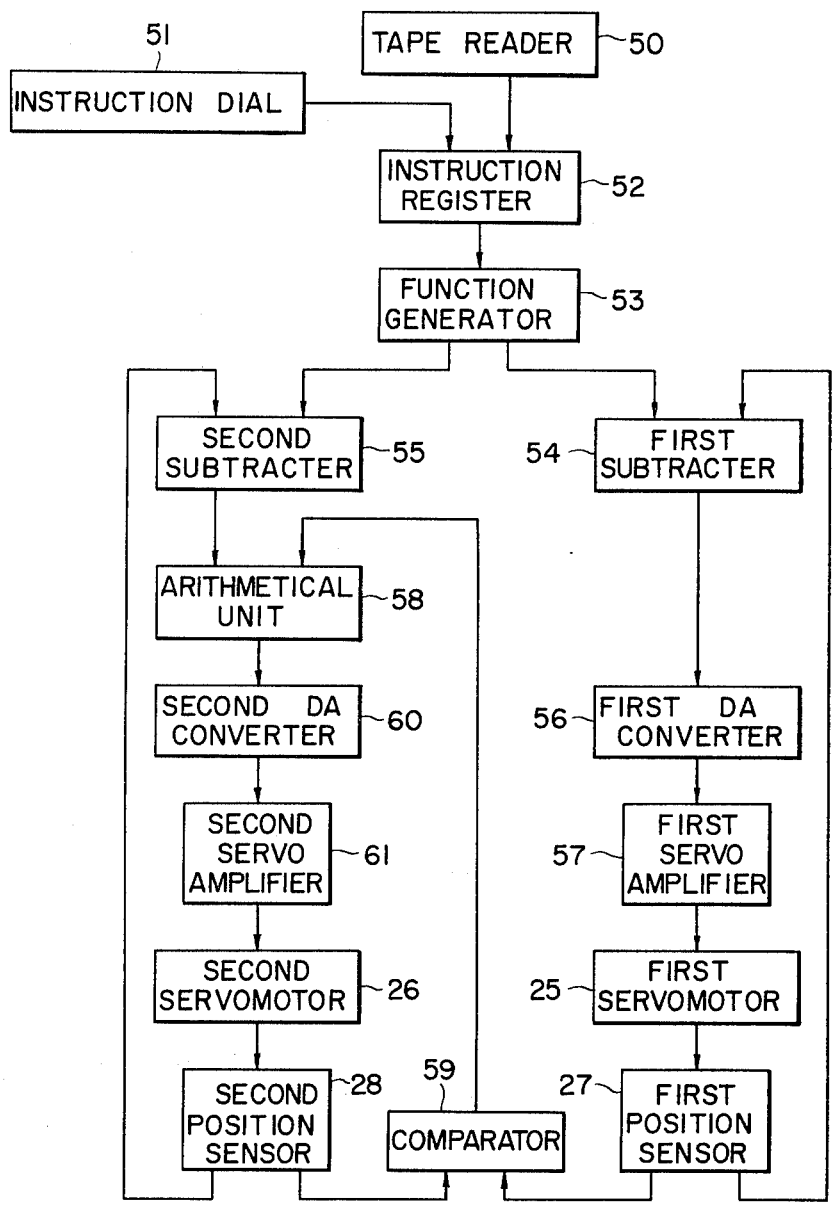
FIG. 3 is a block diagram of means, included in the N/C system of FIG. 1, for controlling the movements of the pair of saddles in the longitudinal direction of the lathe.

FIG. 3 is a block diagram of means, included in the N/C system 22, for controlling the first and second servomotors 25 and 26 so as to cause synchronized movements of the first and second saddles 10 and 11 for the purposes of our invention. The N/C system includes, as input means, a usual tape reader 50 or instruction dial 51 connected to an instruction register 52. The information representing the desired movements or positions of the saddles 10 and 11 in the longitudinal direction of the lathe is input through the tape reader 50 or instruction dial 51 to the instruction register 52, which holds the information.

The output terminal of the instruction register 52 is connected to a function generator 53. The output terminals of the function generator 53 are connected to a first subtracter 54 for the first saddle 10 and to a second subtracter 55 for the second saddle 11. Receiving from the instruction register 52 the signals representative of the desired final positions of the saddles 10 and 11, the function generator 53 continuously delivers to the two subtracters 54 and 55 the successive instantaneous values representative of the paths to be followed by the saddles, until the output values represent the final positions.

Connected to another input terminal of the first subtracter 54 is the first position sensor 27 associated with the first servomotor 25 for sensing the successive actual positions of the first saddle 10. The first subtracter 54 carries out subtraction of the output from the function generator 53 and the output from the first position sensor 27, producing an output corresponding to the difference therebetween.

The output from the first subtractor 54 is of digital format. Since the various servomotors used on this lathe are all energized with analog quantities, the digital output from the first subtracter 54 must be converted into analog format prior to delivery to the first servomotor 25. Thus the output of the first subtracter 54 is connected to a first digital-to-analogl converter 56, which takes in the digital signal and puts out an essentially proportional analog signal.

The output terminal of the first converter 56 is connected to a first servo amplifier 57 and thence to the first servomotor 25. The analog output from the first converter 56 is thus amplified and delivered to the first servomotor 25 thereby causing the same to feed the first saddle 10 in the longitudinal lathe direction.

Connected to another input terminal of the second subtractor 55 is the second position sensor 28 associated with the second servomotor 26 for sensing the successive actual positions of the second saddle 11. The second subtracter 55 performs subtraction of the output from the function generator 53 and the output from the second position sensor 28 and produces an output corresponding to the difference therebetween. The output terminal of the second subtracter 55 is connected to an input terminal of an arithmetical unit 58.

The arithmetical unit 58 has another input terminal connected to a comparator 59, which has its two input terminals connected respectively to the first and second position sensors 27 and 28. Thus the comparator 59 delivers to the arithmetical unit 58 a signal representative of the difference, if any, between the outputs from the position sensors 27 and 28. The arithmetical unit 58 uses this comparator output for correction, as required, of the output from the second subtracter 55.

The output terminal of the arithmetical unit 58 is connected to the second servomotor 26 via s second converter 60 and a second servo amplifier 61. The second converter 60 converts the digital output from the arithmetical unit 58 into a corresponding analog signal. The second servo amplifier 61 amplifies this analog signal and delivers the amplified analog signal to the second servomotor 26 thereby causing the same to move the second saddle 11 in the lathe longitudinal direction.

In this manner the N/C system 22 causes the first and second saddles 10 and 11 to travel synchronously along the respective longitudinal guideways 23 and 24. During such travel of the saddles 10 and 11, the first and second position sensors 27 and 28 deliver to the first and second subtracters 54 and 55 the outputs representative of the varying positions of the two saddles. The subtracters 54 and 55 effect subtraction of these position sensor outputs and the successive instantaneous output values delivered from the function generator 53, causing the servomotors 25 and 26 to be energized so that the results of the subtractions become zero. The energization of the servomotors terminates when the results of the subtractions become zero, that is, when the saddles 10 and 11 reach the desired positions.

Although not specifically illustrated, the circuitry for causing synchronous movements of the first and second cross slides 13 and 14 in the lathe transverse direction can be of like configuration.

What follows is a description of the operation of the numerically controlled lathe of FIGS. 1 and 2, which will serve also as a detailed discussion of the work positioning method in accordance with our invention. The following assumptions will be made in starting the description:

(1) The first and second cross slides 13 and 14 have been moved to their corresponding retracted positions, remote from each other.

(2) The first and second turrets 15 and 16 have been indexed to such angular positions that the first and second gripper assemblies 17 and 18 are in their working positions, opposite to each other.

(3) The gripping jaws of the chuck 20 are open, ready to receive and hold the workpiece 19 as the latter is inserted into the chuck.

The automatic work positioning operation of the lathe starts as each new workpiece is deposited in the preassigned standby position on the lathe by suitable loading means (not shown). The standby position can be anywhere in which the workpiece can be caught by the pair of gripper pawls 37 and 48 for transportation to and insertion into the chuck 20. In this particular embodiment the standby position is shown at 19' on the lathe bed 12, remote from the chuck 20 and offset from the axis of the work spindle 21. Thus deposited in the standby position 19', moreover, the workpiece should have its axis lying in a horizontal plane containing the axis of the work spindle 21.

Under the control of the N/C system 22, the first and second servomotors 25 and 26 are energized in such a direction as to cause rightward travel of the saddles 10 and 11 along the longitudinal guideways 23 and 24 on the lathe bed 12. The rightward travel of the saddles 10 and 11 terminates in prescribed positions where the axes of the two gripper pawl spindles (one shown at 41 in FIG. 2) become aligned across the workpiece 19 in the standby position 19'.

Then the third and fourth servomotors 31 and 32 are energized in such directions that the cross slides 13 and 14 travel toward each other along the transverse guideways 29 and 30 on the saddles 10 and 11, until the pair of gripper pawls 37 and 48 are both forced under equal spring pressures against the workpiece 19. With the cross slides 13 and 14 thus positioned on the saddles 10 and 11 the gripper pawls 37 and 48 firmly grip the workpiece 19, while being thereby slightly disposed rearwardly to cause deflections of the disc spring assemblies (one shown at 47 in FIG. 2). Since these spring assemblies exert equal but opposite forces on the gripper pawls, the gripped workpiece still remains in the precise standby position.

Then, in order to position the gripped workpiece 19 on the chuck 20, the four servomotors 25, 26, 31 and 32 are energized to cause both saddles 10 and 11 to travel leftward along the longitudinal guideways 23 and 24 and to cause both cross slides 13 and 14 to travel downward (as viewed in FIG. 1) along the transverse guideways 29 and 30. The four servomotors are all stopped when the workpiece 19 is inserted into the chuck 20 to a predetermined degree. Then the gripping jaws of the chuck 20 are closed, thereby securely holding the work in the machining position.

Following the closure of the chuck jaws the third and fourth servomotors 31 and 32 are re-energized to cause retraction of the cross slides 13 and 14. Then the two turrets 15 and 16 are indexed to turn desired tools thereon to the working positions in place of the gripper assemblies 17 and 18. Thereafter the machining of the workpiece 19 starts and proceeds in the usual manner.

The two turrets 15 and 16 are again indexed upon completion of the machining operation in order to bring the gripper assemblies 17 and 18 to the working positions. With the four servomotors 25, 26, 31 and 32 energized subsequently, the two saddles 10 and 11 and the two cross slides 13 and 14 are fed in the required directions to cause the gripper assemblies 17 and 18 to grip the machined product on the chuck 20. The gripping jaws of the chuck are then opened to release the product, and the four servomotors are re-energized to permit the gripper assemblies 17 and 18 to carry the released product to a preassigned delivery position on the lathe bed 12.

As will be understood from the previous description with reference to FIG. 3, the entire foregoing operation proceeds automatically in accordance with the program input to the N/C system 22.

Figure 4:
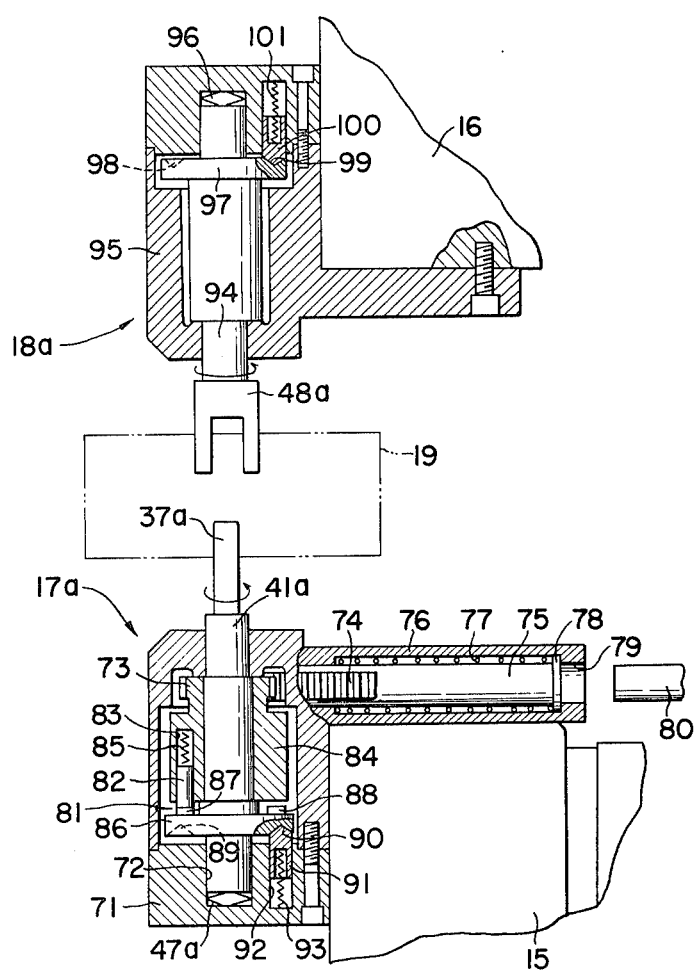
FIG. 4 is a horizontal sectional view of a modified pair of gripper assemblies and associated means.
Figure 5:
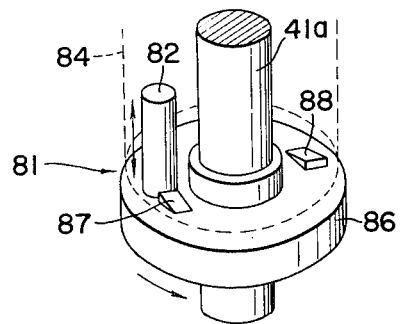
FIG. 5 is a relatively enlarged perspective view showing in particular the ratchet drive linkage used with one of the modified gripper assemblies of FIG. 4.

FIGS. 4 and 5 show a modified pair of gripper assemblies 17a and 18a, which permit automatic reversal, or turning through 180°, of the workpiece about a transverse axis to enable consecutive machining of its opposite end portions. The modified first gripper assembly 17a includes a gripper pawl 37a which itself is identical in shape with the gripper pawl 37, FIG. 2, of the gripper assembly 17.

The gripper pawl 37a is rigidly anchored to one end of a gripper pawl spindle 41a which is mounted in a hollow body 70, complete with a rigid end cover 71, for both rotary and endwise sliding movements relative to the same. The hollow body 70 with its end cover 71 is suitably affixed to the turret 15, with the gripper pawl spindle 41a oriented radially of the turret. The other end of the gripper pawl spindle 41a is slidably fitted in a bore 72 in the hollow body end cover 71 and abuts against a disc spring assembly 47a disposed therein, so that the gripper pawl 37a is spring biased radially outwardly of the turret 15.

Within the hollow body 70, a pinion 73 is rotatably mounted on the gripper pawl spindle 41a and meshes with a rack 74 rigidly carried by a carrier rod 75. The rack 74 with its carrier rod 75 is reciprocally mounted within a rack housing 76 which may be formed integral with the hollow body 70 and which extends longitudinally of the lathe. A compression spring 77 is sleeved upon the rack carrier rod 75 and acts on its terminal flange 78 to normally hold the rod abutting against the right end of the rack housing 76, away from the work spindle 21.

The rack housing 76 has a clearance hole 79 formed centrally in its right end to permit a pusher rod 80 to relatively enter the rack housing. The pusher rod 80 is fixedly mounted in a prescribed position on the lathe bed 12, in collinear relationship to the rack carrier rod 75. Thus, as the saddle 10 travels rightward along the longitudinal guideway 23, FIG. 1, the pusher rod 80 relatively enters the rack housing 76 through its clearance hole 79 thereby causing leftward movement of the rack 74 relative to the rack housing 76 and hence the rotation of the pinion 73. This rightward travel of the saddle 10, along with the other saddle 11, continues until the pinion 73 rotates 180°.

In order to transmit this 180° rotation of the pinion 73 to the gripper pawl spindle 41a, there is employed a one-way drive mechanism generally designated 81. The one-way drive mechanism 81 is a ratchet mechanism including a click 82 slidably fitted in a guide hole 83 formed in a sleeve 84 on the gripper pawl spindle 41a, with the guide hole extending parallel to the gripper pawl spindle. The sleeve 84 is formed integral with the pinion 73 for simultaneous rotation therewith relative to the gripper pawl spindle 41a. A compression spring 85 in the guide hole 83 biases the click 82 against a flange 86 integral with the gripper pawl spindle 41a.

As will be seen also from FIG. 5, the one-way drive mechanism 81 further comprises two ratchet teeth 87 and 88 of identical shape and size formed on one of the surfaces of the gripper pawl spindle flange 86 with a pitch spacing of 180°. Each of these ratchet teeth 87 and 88 has a surface normal to the surface of the gripper pawl spindle flange 86, for positive engagement with the click 82, and a sloping surface permitting the click to slide thereover. Normally the click 82 is in engagement with the left hand ratchet tooth designated 87.

The noted 180° rotation of the pinion 73, in the direction of the arrows in FIGS. 4 and 5, is therefore transmitted to the gripper pawl spindle flange 86 through the interengaging click 82 and ratchet tooth 87.

The gripper pawl spindle flange 86 has two positioning recesses or depressions 89 and 90 of conical shape formed in its surface away from the sleeve 84. These positioning recesses also have a center-to-center angular spacing of 180° and are shown to be in register with the ratchet teeth 87 and 88. A lockpin 91, having one end cone-shaped to fit into the conical positioning recesses 89 and 90, is slidably received in a guide hole 92 formed in the end cover 71 of the hollow body 70. A compression spring 93 in the guide hole 92 biases the lockpin 91 against the gripper pawl spindle flange 86.

FIG. 4 shows the lockpin 91 as being spring biased into engagement in the right hand positioning recess 90. Upon 180° rotation of the gripper pawl spindle flange 86 in the arrow-marked direction, the lockpin 91 will fall into the other positioning recess 89 thereby locking the gripper pawl spindle flange 86 and therefore the gripper pawl 37a against rotation in spite of the subsequent rotation of the pinion 73 in the opposite direction.

The modified second gripper assembly 18a may be identical in construction with the first gripper assembly 17a, particularly in cases where these gripper assemblies are expected to handle heavy workpieces. Normally, however, the simpler construction of FIG. 4 is preferred.

The modified second gripper assembly 18a of simplified construction includes a gripper pawl 48a of identical make with the gripper pawl 48 of FIGS. 1 and 2. The gripper pawl 48a is rigidly anchored to one end of a spindle 94 which is supported by a hollow body 95 for both rotary and endwise movements relative to the same. A disc spring assembly 96 biases the gripper pawl spindle 94 radially outwardly of the turret 16 to which the hollow body 95 is screwed or otherwise fastened.

A flange 97 integral with the gripper pawl spindle 94 has two conical positioning recesses or depressions 98 and 99 formed in diametrically opposite positions in one of its surfaces. A lockpin 100 under the bias of a compression spring 101 is to be engaged in these positioning recesses 98 and 99 for locking the gripper pawl spindle 94 against unnecessary angular displacement.

In the operation of the numerically controlled lathe incorporating the modified pair of gripper assemblies 17a and 18a, it is assumed that the workpiece 19 being held by the chuck 20 is now caught between the pair of gripper pawls 37a and 48a, following the machining of the exposed end portion of the workpiece. The axes of the two gripper pawl spindles 41a and 94 must be in exact alignment in the transverse direction of the lathe.

The N/C system 22 causes the chuck 20 to open its gripping jaws and, immediately thereafter, causes the pair of saddles 10 and 11 to travel rightward, away from the headstock 49, together with the semifinished workpiece 19 caught between the gripper pawls 37a and 48a. During the rightward travel of the saddles 10 and 11, the pair of cross slides 13 and 14 may simultaneously be moved, as required, in either of the opposite transverse directions, to positions where the rack carrier rod 75 of the first gripper assembly 17a is in axial alignment with the pusher rod 80 on the lathe bed 12.

Thus, with the rightward travel of the saddles 10 and 11, the rack carrier rod 75 moves into abutment against the pusher rod 80. The rightward saddle movement still continues, resulting in the leftward travel of the rack carrier rod 75, and therefore of the rack 74 thereon, relative to the rack housing 76 against the bias of the compression spring 77. Thus moved leftward, the rack 74 causes rotation of the pinion 73 in the arrow marked direction. This rotation of the pinion 73 is transmitted to the gripper pawl spindle 41a via the click 82 in engagement with the ratchet tooth 87 on the gripper pawl spindle flange 86. The lockpin 90 is forced out of the conical positioning recess 90 in the gripper pawl spindle flange 86 against the bias of the compression spring 93 immediately when the flange starts rotation.

Upon 180° rotation of the gripper pawl spindle flange 86, the lockpin 90 falls into the other positioning recess 89 under the bias of the compression spring 93. An electric switch (not shown) senses this 180° rotation of the gripper pawl spindle flange 86 and delivers a signal to the N/C system 22, thereby causing the same to discontinue the rightward travel of the saddles 10 and 11.

The 180° rotation of the gripper pawl spindle flange 86 and therefore of the gripper pawl spindle 41a results, of course, in the rotation of the workpiece 19, and of the other gripper pawl spindle 94, through the same angle. In the second gripper assembly 18a, therefore, the lockpin 100 is also forced out of the positioning recess 99 at the start of rotation of the gripper pawl spindle 94 and is spring energized into the other positioning recess 98 upon completion of its 180° rotation.

Thereafter the N/C system 22 causes the saddles 10 and 11 to travel back toward the headstock 49 and, if necessary, further causes the cross slides 13 and 14 to travel in a direction required to align the axis of the reversed workpiece 19 with that of the work spindle 21. The N/C system 22 stops the saddles 10 and 11 when the workpiece 19 is inserted into the chuck 20, and then causes the chuck to grip the workpiece.

During the leftward travel of the saddles 10 and 11, the pusher rod 80 relatively moves out of the rack housing 76 thereby permitting the rack carrier rod 75, and the rack 74 thereon, to travel rightward relative to the rack housing under the bias of the compression spring 77. This rightward travel of the rack 74 results in the rotation of the pinion 73 in the direction opposite to the arrow direction. The gripper pawl spindle 41a does not ratate with the pinion 73 in the opposite direction, however, since the lockpin 91 is now engaged in the positioning recess 89 and since the lockpin 100 of the second gripper assembly 18a is also engaged in the positioning recess 98.

The click 82 of the one-way drive mechanism 81 simply slides over the gripper pawl spindle flange 86 and further over the sloping surface of the ratchet tooth 88, falling back onto the flange 86 at the end of the 180° rotation of the pinion 73 in the opposite direction. Thus the click 82 is made ready to engage the ratchet tooth 88 when the rack carrier rod 75 is moved into abutting engagement with the pusher rod 80 the next time.

The embodiment of the invention shown in FIGS. 4 and 5 possesses the advantage that no particular drive mechanism is required for reversal of the workpiece. The workpiece can be inverted as, essentially, it is pulled out of the chuck.

In the use of the dual-turret lathe shown in FIG. 1 a particular advantage will be gained if, for example, a pair of turners on the two turrets are jointly employed, in transverse alignment, for removing stock from the revolving workpiece to the same depth, while the pair of saddles are being fed synchronously in the longitudinal direction. The workpiece can then be machined at a feed speed twice as high as in the case where a single turning is used, to provide the same degree of finished surface quality. Such high speed turning also makes it easier to break the removed stock into small chips or curls.

Although we have shown and described our invention as adapted for positioning work on the chuck by transporting the same from a preassigned standby position on the lathe bed, we also contemplate, within the purview of the invention, its adaptation for lathes of the type in which each desired length of bar stock is pulled out of an axial hollow in the work spindle for machining. How the successive desired lengths of the bar stock can be pulled from the standby position within the hollow work spindle to the machining position in accordance with the inventive concept, is believed clearly apparent from the foregoing description.

Additional modifications and adaptations of our invention will readily occur to one skilled in the art.

What is claimed is:

1. In a numerically controlled lathe, a method of automatically carrying work from a preassigned standby position on the lathe to a machining position, which method comprises providing a pair of saddles which are mounted on a lathe bed for movement in a first direction as dictated by a numerical control system, providing a pair of cross slides which are mounted on the respective saddles for movement in a second direction at right angles to the first direction as dictated by the numerical control system, the cross slides having mounted thereon a cooperative pair of gripper means for releasably engaging and holding the work therebetween, causing the numerical control system to move the pair of saddles to such positions that the pair of gripper means are located on opposite sides of the work lying in the standby position, causing the numerical control system to move the pair of cross slides toward each other until the work is engaged between the pair of gripper means, and causing the numerical control system to move at least the pair of saddles for carrying the work to the machining position.

2. The method of claim 1, which further comprises causing the numerical control system to move the pair of saddles away from the machining position together with the work caught between the pair of gripper means, simultaneously revolving the pair of gripper means and the work through a predetermined angle about an axis in the second direction, and causing the numerical control system to move the pair of saddles for carrying the work back to the machining position.

3. In a numerically controlled lathe, in combination, a lathe bed, a pair of saddles mounted on the lathe bed for movement in a first direction, a pair of cross slides mounted on the respective saddles for movement in a second direction at right angles to the first direction, a cooperative pair of gripper means carried by the respective cross slides for releasably engaging and holding work therebetween upon movement of the cross slides toward each other, and a numerical control system for individually controlling the movements of the pair of saddles and the pair of cross slides, whereby the numerical control system can be programmed for causing the pair of gripper means to carry the work from a preassigned standby position on the lathe to a machining position.

4. The numerically controlled lathe of claim 3, wherein each gripper means includes a V-shaped gripper pawl.

5. The numerically controlled lathe of claim 4, wherein the gripper pawl has its opposite ends bifurcated for receiving the opposite ends of the other gripper pawl as required.

6. The numerically controlled lathe of claims 4 or 5, wherein the pair of gripper means further comprise means for yieldably urging the gripper pawls toward each other.

7. The numerically controlled lathe of claim 3, wherein each gripper means is mounted on an indexing turret carried by one of the cross slides.

8. The numerically controlled lathe of claim 3, further comprising means for revolving the work, while the same is being held by the pair of gripper means, through a predetermined angle about an axis extending in the second direction.

9. The numerically controlled lathe of claim 8, wherein each gripper means comprises a gripper pawl coacting with the other gripper pawl for holding the work, and a spindle to which the gripper pawl is rigidly connected and which is mounted on one of the cross slides for rotation about its own axis extending in the second direction, and wherein the revolving means comprises a pinion rotatably mounted on at least one of the gripper pawl spindles, a rack meshing with the pinion and mounted on one of the cross slides for movement in the first direction, a stationary pusher on the lathe bed for engaging and moving the rack relative to said one cross slide upon movement of the pair of saddles away from the machining position and thus for causing the pinion to rotate in a predetermined direction, a one-way drive mechanism for transmitting the rotation of the pinion in the predetermined direction to said one gripper pawl spindle, and means for locking at least said one gripper pawl spindle against angular displacement upon completion of the revolution of the work through the predetermined angle.

10. The numerically controlled lathe of claim 9, wherein the one-way drive mechanism comprises a flange formed integral with said one gripper pawl spindle, a plurality of angularly spaced ratchet teeth formed on one of the opposite surfaces of the flange, a sleeve slidably fitted over said one gripper pawl spindle for simultaneous rotation with the pinion, the sleeve having formed therein a guide hole extending parallel to its axis, a click slidably fitted in the guide hole, and means for yieldably urging the click against said one surface of the flange for operative engagement with the ratchet teeth.

* * * * *